United States Patent
McClure

(10) Patent No.: US 10,612,578 B2
(45) Date of Patent: *Apr. 7, 2020

(54) BLIND FASTENER WITH INTEGRATED ANTI-ROTATION FEATURE, SYSTEMS AND METHODS

(71) Applicant: Centrix Inc., Kent, WA (US)

(72) Inventor: Travis McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,326

(22) Filed: Aug. 30, 2018

(65) Prior Publication Data

US 2018/0372140 A1    Dec. 27, 2018

Related U.S. Application Data

(60) Continuation of application No. 15/652,168, filed on Jul. 17, 2017, now Pat. No. 10,094,408, which is a
(Continued)

(51) Int. Cl.
*F16B 13/12* (2006.01)
*F16B 13/08* (2006.01)
(Continued)

(52) U.S. Cl.
CPC ........ *F16B 13/0833* (2013.01); *F16B 5/0258* (2013.01); *F16B 19/109* (2013.01); *F16B 19/1081* (2013.01)

(58) Field of Classification Search
USPC .......... 411/80.1, 54.1, 57.1, 60.1, 65, 72, 85
See application file for complete search history.

(56) References Cited

U.S. PATENT DOCUMENTS 1,978,935 A   10/1934  Douglas
2,370,336 A    2/1945  Wallace
(Continued)

FOREIGN PATENT DOCUMENTS

EP    0275160 A2    7/1988
EP    0414162 A1    2/1991
(Continued)

OTHER PUBLICATIONS

European Patent Office, Extended European Search Report Issued in Application No. 10815720.7, dated Sep. 14, 2012, Germany, 6 pages.
(Continued)

*Primary Examiner* — Gary W Estremsky
(74) *Attorney, Agent, or Firm* — McCoy Russell LLP

(57) ABSTRACT

Fasteners and related systems according to the invention include a collet body having a first part of a two part anti-rotation arrangement and a cylinder body having a second part of the two part anti-rotation arrangement wherein the collet body and the cylinder body are mateably axially translatable with respect to each other, and have the same or similar outer diameter in some embodiments or not in others. A threaded member rotationally engages the collet body and compressively contacts the cylinder body during operation of the fastener to creating a clamping effect. Rotational interference between the first and second parts of the anti-rotation arrangement preferably occurs at sectional face portions of at least the collet body. Resistance to induced rotation of the cylinder body relative to a work piece rotation of the threaded member is preferably provided by a tool engaging a tool interface present on the cylinder body.

21 Claims, 9 Drawing Sheets

Related U.S. Application Data division of application No. 13/231,951, filed on Sep. 13, 2011, now Pat. No. 9,709,085, which is a continuation-in-part of application No. PCT/US2010/000802, filed on Mar. 15, 2010.

(60) Provisional application No. 61/210,007, filed on Mar. 13, 2009.

(51) Int. Cl.
*F16B 5/02* (2006.01)
*F16B 19/10* (2006.01)

(56) References Cited

U.S. PATENT DOCUMENTS

| | | | |
|---|---|---|---|
| 2,379,786 A | 7/1945 | Bugg et al. | |
| 2,649,884 A | 8/1953 | Westover | |
| 2,775,155 A | 12/1956 | Tompkins et al. | |
| 2,878,709 A * | 3/1959 | Horvath | E21D 21/008 411/47 |
| 2,936,015 A | 5/1960 | Rapata | |
| 2,994,242 A | 8/1961 | Buff et al. | |
| 3,469,493 A | 9/1969 | Fisher | |
| 3,472,111 A * | 10/1969 | Teizo | F16B 13/068 411/65 |
| 3,522,755 A * | 8/1970 | Michell | E21D 21/008 411/50 |
| 3,728,761 A | 4/1973 | Holly | |
| 3,974,735 A | 8/1976 | Berner | |
| 4,015,505 A | 4/1977 | Murray | |
| 4,278,006 A * | 7/1981 | Lobello | F16B 13/066 405/259.3 |
| 4,516,885 A | 5/1985 | Calandra, Jr. | |
| 4,548,533 A | 10/1985 | Pratt | |
| 4,789,284 A * | 12/1988 | White | E21D 21/008 405/259.3 |
| 5,065,490 A | 11/1991 | Wivagg et al. | |
| 5,161,916 A * | 11/1992 | White | E21D 21/008 405/259.4 |
| 5,531,792 A * | 7/1996 | Huene | A61B 17/68 411/24 |
| 5,704,752 A | 1/1998 | Logerot | |
| 5,772,372 A | 6/1998 | Lins et al. | |
| 6,174,118 B1 | 1/2001 | Rebers | |
| 6,241,050 B1 * | 6/2001 | Hikita | B66B 1/18 187/386 |
| 6,287,044 B1 | 9/2001 | Huber | |
| 7,600,956 B2 | 10/2009 | McDuff et al. | |
| 7,780,387 B2 | 8/2010 | Talpe | |
| 7,993,085 B2 | 8/2011 | McClure | |
| 8,007,215 B2 * | 8/2011 | Chen | F16B 13/0808 411/26 |
| 8,075,234 B2 * | 12/2011 | McClure | F16B 19/1081 411/71 |
| 2002/0144574 A1 | 10/2002 | Avetisian et al. | |
| 2005/0169726 A1 | 8/2005 | McClure | |
| 2007/0243037 A1 | 10/2007 | Pratt | |
| 2007/0253793 A1 * | 11/2007 | Moore | F16B 13/065 411/43 |
| 2011/0081219 A1 | 4/2011 | Chen | |

FOREIGN PATENT DOCUMENTS

| | | |
|---|---|---|
| GB | 413403 A | 7/1934 |
| GB | 624714 A | 6/1949 |
| GB | 1548964 A | 7/1979 |
| GB | 2335951 A | 10/1999 |
| JP | H1151018 A | 2/1999 |
| JP | 2010522311 A | 7/2010 |
| WO | 03069971 A2 | 8/2003 |
| WO | 2009095640 A1 | 8/2009 |
| WO | 2010027439 A2 | 3/2010 |

OTHER PUBLICATIONS

State Intellectual Property Office of the People's Republic of China, Office Action Issued in Application No. 201080019848.9, dated Apr. 17, 2013, 13 pages.

Japan Patent Office, Notice of Allowance Issued in Application No. 2011-554056, dated Oct. 7, 2014, 6 pages. (Submitted with Machine Translation).

Anonymous, Third Party Observation Submitted in European Patent Application No. 10815720.7 (Publication No. EP2406506), dated Feb. 4, 2015, 4 pages.

European Patent Office, Extended European Search Report Issued in Application No. 16184795.9, dated Dec. 9, 2016, Germany, 7 pages.

* cited by examiner

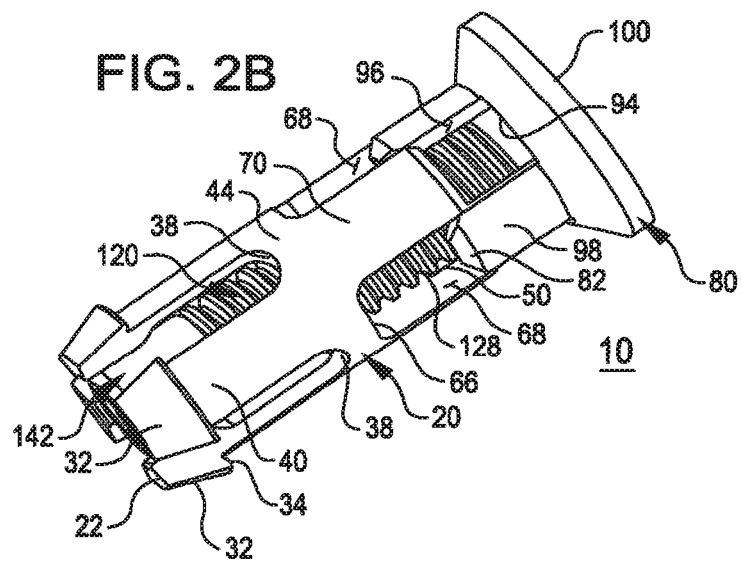
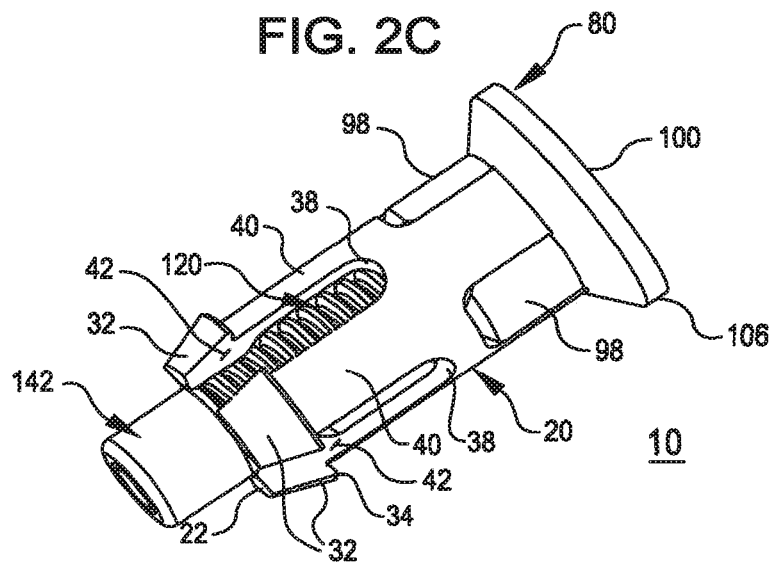

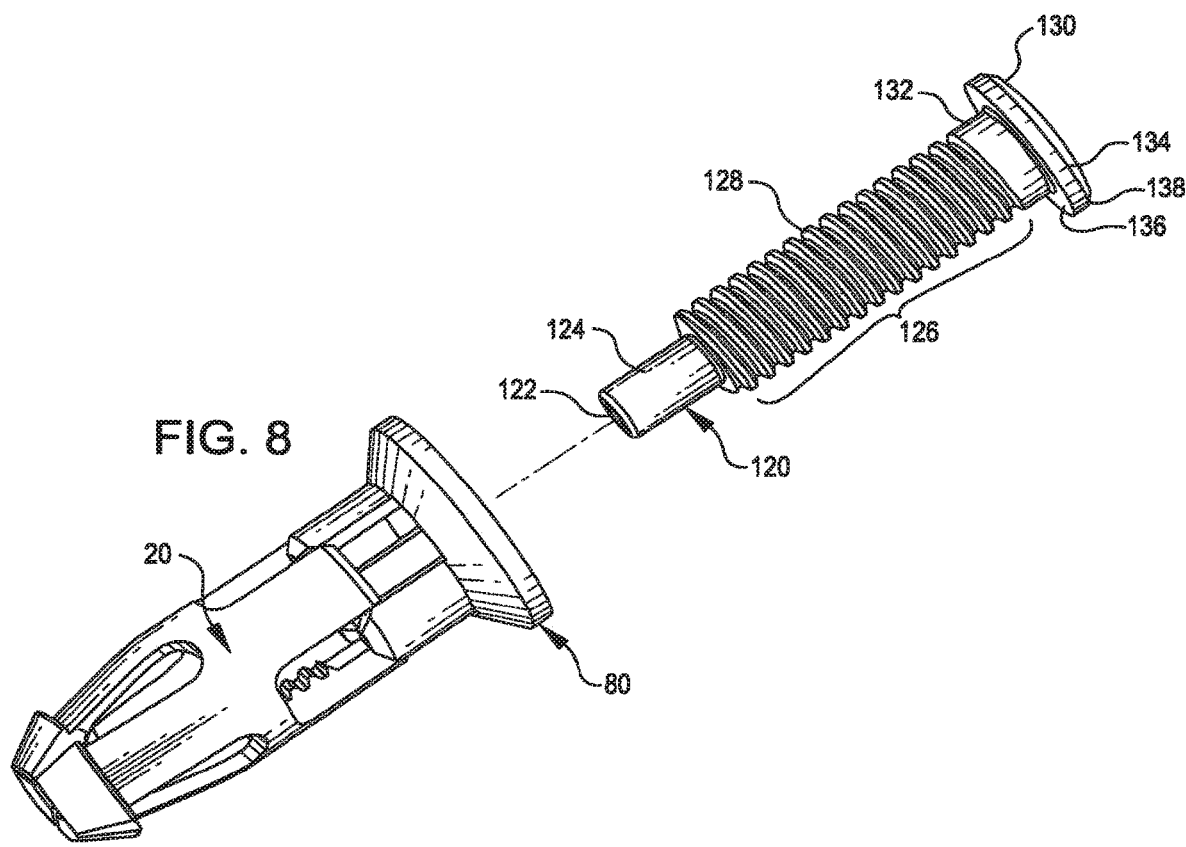
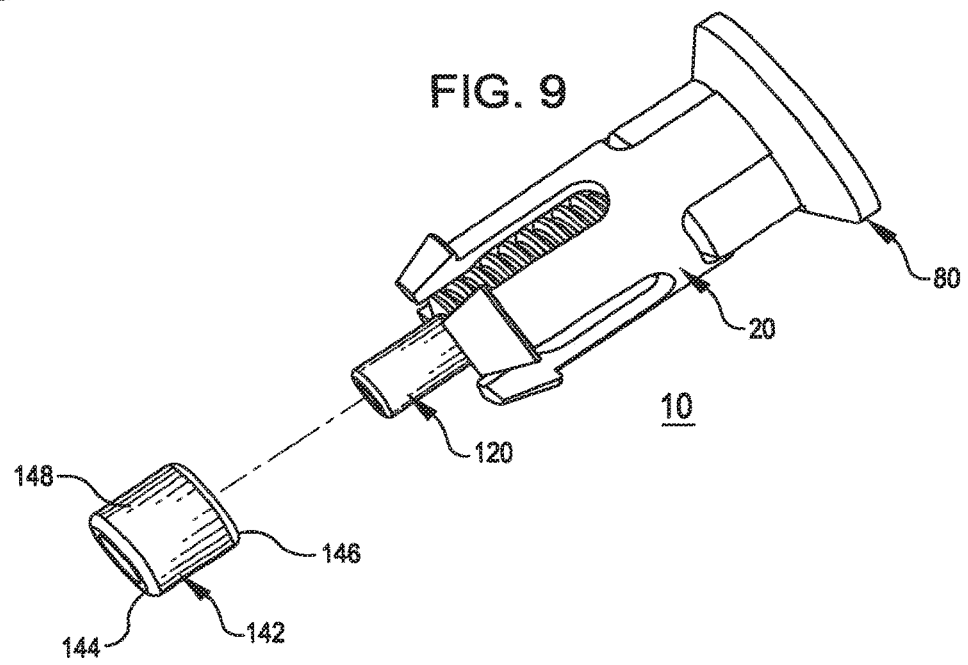

BLIND FASTENER WITH INTEGRATED ANTI-ROTATION FEATURE, SYSTEMS AND METHODS

CROSS REFERENCE TO RELATED APPLICATIONS

The present application is a continuation of U.S. patent application Ser. No. 15/652,168 entitled "BLIND FASTENER WITH INTEGRATED ANTI-ROTATION FEATURE, SYSTEMS AND METHODS," and filed on Jul. 17, 2017. U.S. patent application Ser. No. 15/652,168 is a divisional of U.S. patent application Ser. No. 13/231,951 entitled "BLIND FASTENER WITH INTEGRATED ANTI-ROTATION FEATURE, SYSTEMS AND METHODS," and filed on Sep. 13, 2011, now U.S. Pat. No. 9,709,085. U.S. patent application Ser. No. 13/231,951 is a continuation-in-part of International Patent Application No. PCT/US2010/000802 entitled "BLIND FASTENER WITH INTEGRATED ANTI-ROTATION FEATURE, SYSTEMS AND METHODS," and filed on Mar. 15, 2010. International Patent Application No. PCT/US2010/000802 claims priority to U.S. Provisional Application No. 61/210,007 entitled "BLIND FASTENER WITH INTEGRATED ANTI-ROTATION FEATURE," and filed on Mar. 13, 2009. The entire contents of each of the above-identified applications are hereby incorporated by reference in their entirety for all purposes.

BACKGROUND OF THE INVENTION

A new generation of blind fasteners permits non-permanent association of at least two work pieces through the use of a single dimensioned collet body wherein each work piece has a defined range of possible thicknesses and thus defines a bore or hole of variable depth. See the disclosure found in WO 03/069971 (application number PCT/US03/02925), which is incorporated herein by reference. In such embodiments, a single collet body interacts directly with, or indirectly, for example, through a sleeve insert mechanically linked to, at least one work piece to prevent unintended rotation of the collet body during axial association and/or disassociation of the at least two work pieces, while axial translation there between remains comparatively unaffected. Thus, at least one work piece constitutes a mechanical ground to provide a means for countering any torque moment that may be induced into the collet body during axial association and/or disassociation of the at least two work pieces. This rotational interference between the collet body and at least one work piece constitutes a two part Anti-Rotation Means ("ARM") wherein the collet body comprises a first part and the work piece (or intermediate piece such as a sleeve insert) comprises a second part of the two part ARM.

SUMMARY OF THE INVENTION

The present invention is directed to fasteners for use in associating, preferably compressively or closely in stacked fashion, at least two work pieces from a single side of one work piece wherein each work piece has a range of possible thicknesses, and consequently each work piece defines a bore or hole of variable length. The invention is further directed to methods for using the above fastener and systems further comprising a stud threadably engageable therewith. Fastener embodiments of the invention comprise a collet body and a cylinder body that are axially matable with each other over a range of displacements, as will be described in detail below. In other words, the distance between one end of the collet body and an opposing end of the cylinder body is variable while the two bodies are in operative contact with each other.

In contrast to the prior art blind fasteners, methods and systems wherein at least one work piece directly (or indirectly through, for example, a bonded sleeve insert) provided a mechanical ground for the second part of a two-part ARM, the mechanical ground in the present invention presents from a frame of reference independent from the work pieces, or structures linked or coupled thereto. In the present invention embodiments, the cylinder body comprises an interface for receiving a temporary anti-rotation tool that prevents induced rotation of the cylinder body during association and/or disassociation of the at least two work pieces.

As used herein with respect to the present invention and unless otherwise specified, a two part ARM comprises first and second structures moveable relative to one another, each structure having one part of the ARM, and each part of which includes at least one reactive surface, although plural reactive surfaces are generally considered desirable for load distribution reasons. During engagement of the two parts, at least one each of the respective reactive surfaces mechanically contact each other to prevent complete, e.g., 360.degree., rotation of one structure relative to the other structure. In other words, at least one each of the reactive surfaces is configured to constructively contact one another in order to prevent complete rotation between structures. While a 1:1 correspondence between complementary reactive surfaces is considered optimal, the ARM only requires that at least one reactive surface from each structure beneficially engage each other. Additional limitations should not be inferred from such configuration: for example, an ARM may permit axial/longitudinal translation the first and second structures while preventing complete rotation there between.

With the foregoing in mind, each fastener and system embodiment of the invention comprises a collet body having a first part of a two part ARM and a cylinder body having a second part of a two part ARM wherein the collet body and the cylinder body are matably axially translatable with respect to each other, but not rotatable with respect to each other. Unlike the prior art, however, the rotational interference between the first and second parts of the ARM does not occur on an exterior surface of both bodies, but at sectional face portions of at least the collet body.

Collet bodies according to the various invention embodiments comprise a first end defining a generally circular opening and a first wall portion adjacent to the first end, where the first wall portion has an interior surface, an exterior surface, a protrusion extending from the exterior surface including a leading face oriented towards the first end and a trailing face oriented away from the first end. In addition, the first wall portion defines at least two secondary slots extending longitudinally from the first end to respective terminus to form at least two flexible fingers, each having a distal end at the first end. The collet body also comprises a second end defining a generally circular opening and a second wall portion adjacent to the second end, where the second wall portion has an interior surface and an exterior surface. In the several embodiments, one of the first wall portion, the second wall portion or the first wall portion and second wall portion interior surface(s) include(s) a threaded portion for threadably engaging a threaded stud in order to form a blind fastening system. As will be described in more detail below, the stud may be removable or captive with relationship to the collet body.

Collet bodies according to the various invention embodiments further comprise the first part of a two part ARM, which rotationally interferes with the second part of the two part ARM present in the cylinder body. The first part of the two part ARM in the various invention embodiments comprises sectional face portions of at least one segment of the collet body second wall portion. The at least one segment is formed in the second wall portion by at least one ARM slot extending from the outer surface thereof to the inner surface thereof (thus, the second end is segmented in a manner analogous to the first end); alternatively stated, the at least one ARM slot is defined, in part, by the section face portions of the at least one segment. The at least one ARM slot extends longitudinally from the second end towards the first end, and preferably terminates prior to the terminus of the secondary slots that form the collet body fingers in order to better provide structural integrity to the collet body. Many embodiments comprise at least two, and preferably four, second wall segments bounded by a similar number of ARM slots.

The skilled practitioner will appreciate that a sectional face portion in certain collet body embodiments need not be established exclusively by a slot extending wholly from an exterior to an interior surface of the second wall portion. It is sufficient that a majority of the sectional thickness of the second wall portion be exposed such as by formation of a deep channel or groove either during manufacturing of the collet body or during post manufacture milling. Moreover, the orientation of the sectional face portion is preferably, although not necessarily, parallel to a radial line from the axis of the collet body in order to minimize shear forces and maximize segment stiffness.

In addition to the foregoing, collet bodies according to many invention embodiments have a generally consistent maximum outside first and second wall portion diameters along the axial direction when the collet body fingers are in their intended "in use" state. In particular, many invention embodiments have a generally constant maximum second wall portion outside diameter from the second end towards the first end, which is preferably maintained at least until the second wall portion transitions to the first wall portion, excluding any intended finger convergence imparted for ease of collet body insertion into a bore or hole of a work piece.

Cylinder bodies according to a variety of fastener embodiments comprise a first end defining a generally circular opening and a first wall portion adjacent to the first end, where the first wall portion has an interior surface and an exterior surface. In addition, the first wall portion comprises sectional face portions of at least one segment to establish the second part of the two part ARM. The at least one segment is formed in the second wall portion by at least one ARM slot extending from the outer surface thereof to the inner surface thereof; alternatively stated, the at least one ARM slot is defined, in part, by the section face portions of the at least one first wall segment. The at least one ARM slot extends longitudinally from the first end towards a second end, where the second end defines a generally circular opening and a second wall portion adjacent to the second end, where the second wall portion has an interior surface and an exterior surface. Depending upon the embodiment, the second end further comprises a flange portion, either continuous or segmented, that extends radially outward from the second end and includes an anti-rotation tool interface or comprises a non-circular exterior surface for interfacing with an anti-rotation tool. In certain other embodiments, the first end and/or any wall portion exterior surface comprises an anti-rotation tool interface.

The skilled practitioner will again appreciate that a sectional face portion in certain cylinder body embodiments need not be established exclusively by a slot extending wholly from an exterior to an interior surface of the first wall portion. It is sufficient that a majority of the sectional thickness of the first wall portion be exposed such as by formation of a deep channel or groove either during manufacturing of the cylinder body or during post manufacture milling. Moreover, the orientation of the sectional face portion is preferably, although not necessarily, parallel to a radial line from the axis of the cylinder body in order to minimize shear forces and maximize segment stiffness.

In a first series of fastener embodiments, the cylinder body slots separating the cylinder body segments extend from the exterior to the interior surface of the first wall portion thereof and are configured so that at least some of the sectional face portions of the cylinder body first wall segments rotationally interfere with the sectional face portions of the collet body second wall when the two bodies are operatively mated together. Because of the presumed full contact between respective sectional face portions of each respective segment, the maximum outside diameters of the cylinder body first wall portion and the collet body second wall portion are preferably similar, and most preferably substantially similar. In other words, the maximum external diameter of the cylinder body at its first end is generally equal to the maximum external diameter of the collet body at its second end wherein at least some, and preferably all, cylinder segments occupy collet body ARM slots. In this manner, it is possible to have a constant external diameter between the collet body and the cylinder body about the respective ARM portions thereof, resulting in the ability of the two part ARM to reside internal to the work piece bore or hole while maintaining close fit opportunities, and thereby minimize shear opportunities between the work pieces. From a practical perspective, this means that a single diameter bore or hole can be formed in the at least two work pieces, that no additional structure such as a sleeve insert need be accounted for, and that a stud, which is used to axially translate the two bodies, need not contact any work piece (an extending lip or flange portion of the cylinder body at its second end necessarily extends radially outward and beyond the work piece periphery defining the hole or bore at the surface thereof to function as the mechanical ground interface, as described in more detail below, and therefore also functions as an intermediate structure between the stud head and the proximate work piece).

In a second series of embodiments, the cylinder body has a maximum external diameter at its first wall exterior surface that is greater than that of the collet body, thereby preventing it from entering work piece bore or hole that is sized only receive the collet body. As a consequence, the functional portions of the ARM reside external to the work pieces. In these embodiments, sectional face portions of the collet body segments (the first part of the ARM) rotationally interfere with sectional face portions of the cylinder body segments, however, the segments are bounded by, for example, grooves formed in the inner surface of the cylinder body first wall. Similarly, the segments form lands that occupy the collet body slots formed in the second wall portion thereof (the second part of the ARM). Alternatively stated, the collet body first part of the ARM engages with a spline arrangement formed in the cylinder body first wall, and itself may also be a spline arrangement, there being no requirement for maintaining maximum outer diameter similarity between the collet body second wall and the cylinder body first wall. As with the first series embodiments, the stud head will contact the cylinder body at its second end and exert a compression force thereon for transfer to the proximately positioned work piece, and create tension in the collet body to thereby cause the work piece proximate to its first end to go into compression, as is appreciated by the skilled practitioner.

A third series of embodiments represents a hybrid of the first and second series. Here, a portion of the cylinder body first wall has an external diameter substantially equal to that of the collet body second end external diameter so that sectional portions of the collet body rotationally interfere with sectional portions of the cylinder body. However, the cylinder body external diameter increases towards its second end such that internal grooves of the first and/or second wall portion(s) receive the collet body segments, and corresponding lands occupy the slots formed in the collet body second wall portion (e.g., internally formed splines).

In many embodiments, it is also desirable to have translation arresting means to prevent unintended separation between the collet body and the cylinder body. Particularly with respect to the first series invention embodiments, an inwardly projecting lip or step may be formed at or near the cylinder body first end to retain the mating association between the collet body and the cylinder body. It may be formed at the first end (sectional portions), or proximate thereto as a segmented annular protrusion formed on the interior surface of the first wall sectional portions. This segmented lip, protrusion or step is intended to reduce the internal diameter of the cylinder body to a degree sufficient to still permit bidirectional translation of the collet body therewith, but interfere with any structure spanning the collet body ARM slots. Because it is necessary to first mate the collet body with the cylinder body, the spanning structure is preferably introduced after mating association. In one series of embodiments, a groove is formed in the inner surface of the collet body second wall at or near the second end to receive a retaining ring. After meshing engagement between the two bodies, the retaining ring is introduced and there after prevents unintended disassociation of the two bodies due to its interference with the lip, protrusion or step of the cylinder body.

In various passages above, the disclosure referenced a stud for rotationally engaging the collet body, to thereby transform its rotation into collet body (and due to its captive association and intermeshing ARM, the cylinder body as well) axial translation. A stud can be removably introduced into the cylinder body and collet body, and engaged with the threads formed on the interior surface of the second wall portion and/or transition zone. However, insertion and removal of the fastener and/or assembly is facilitated if the stud is retained with the fastener to form a system. By introducing a bushing or other structure at a distal end of the stud after full insertion into the collet body, the bushing will not translate past the threaded portion of the collet body, thereby preventing the stud from backing out of the collet body.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE DRAWINGS

FIGS. 2A-C show the fastener system of FIG. 1 in an initial state, an intermediate state, and a final state, respectively;

FIG. 4 is an exploded perspective view of the components comprising the first fastener embodiment prior to initial assembly, with arrows showing the intended mating engagement there between;

FIG. 8 is a perspective view of the arrangement of FIG. 6 prior to introduction of a threaded stud there into;

FIG. 9 is a perspective view of the arrangement of FIG. 8 after introduction of the threaded stud there into and prior to association of a bushing onto a distal end of the stud to form the first fastener system of FIG. 1;

DESCRIPTION OF INVENTION EMBODIMENTS

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Figure 1:
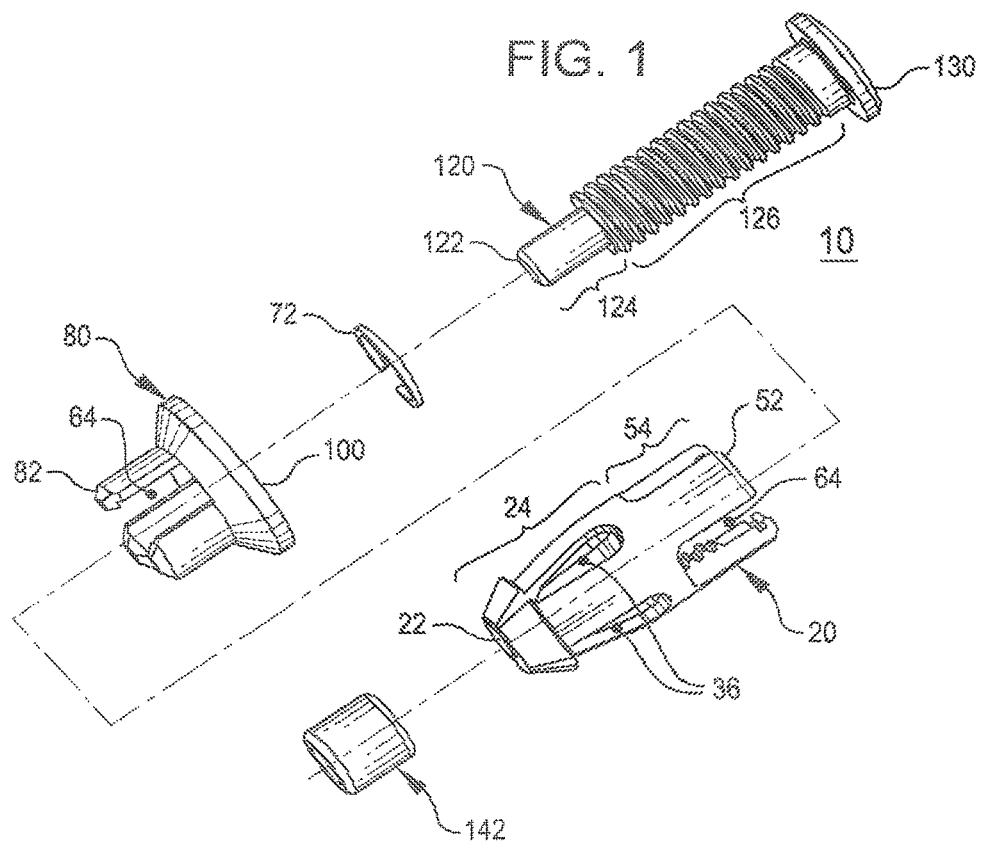
FIG. 1 is an exploded perspective view of a first fastener system embodiment according to the invention wherein a collet body and matable cylinder body, a threaded stud and matable bushing, and a retaining ring are shown.
Figure 2A:
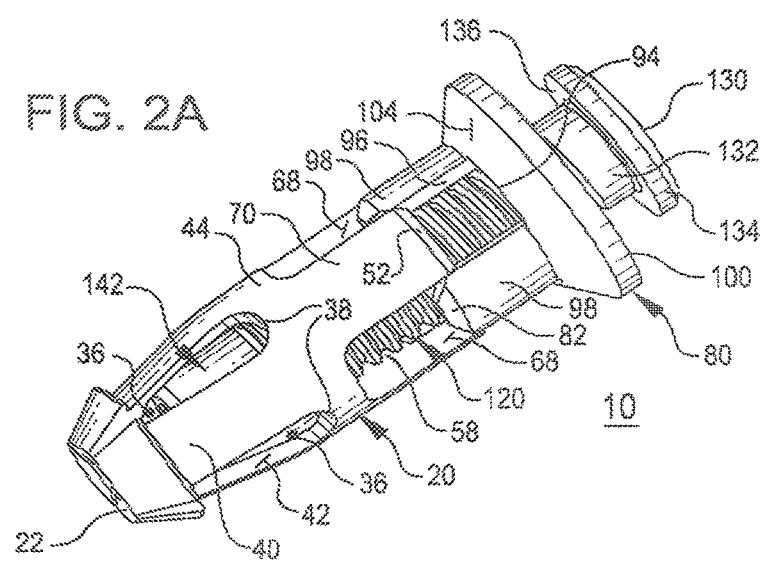
Figure 3A:
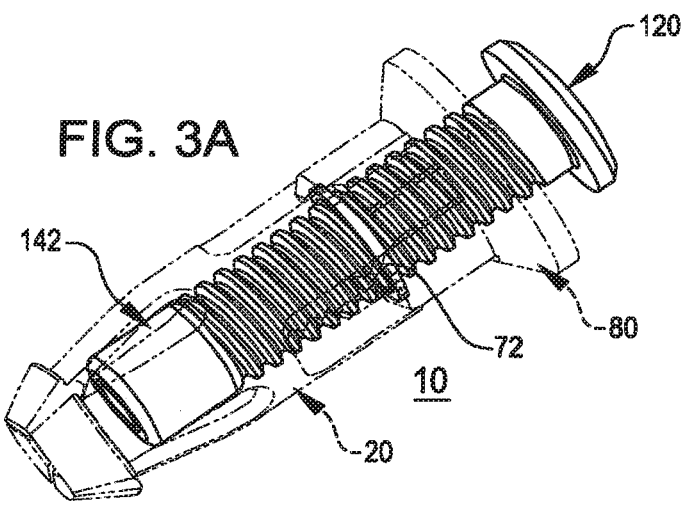
FIGS. 3A-C illustrate the fastener system of FIGS. 2A-C with the several parts shown in phantom.
Figure 3B:
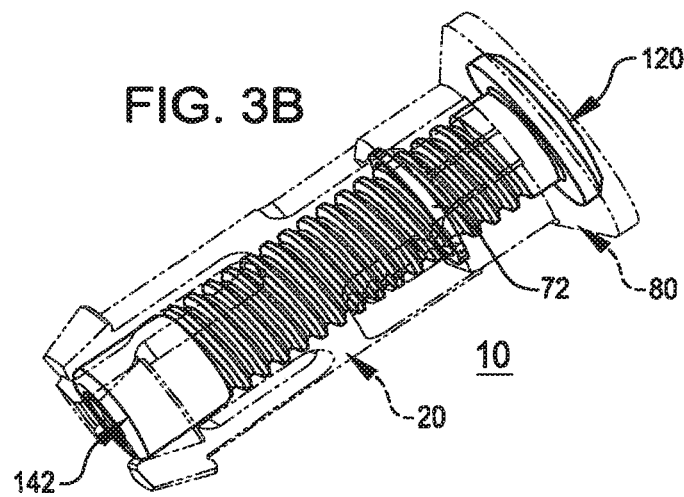
Figure 3C:
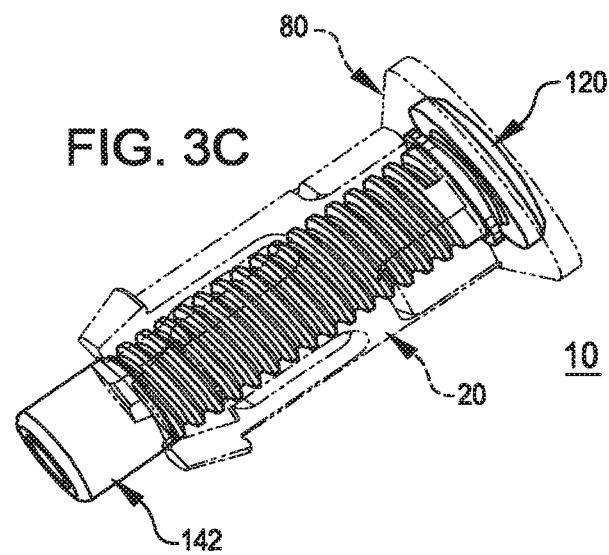

Turning then to the several embodiments, wherein like numerals indicate like parts, and more particularly to FIG. 1 wherein a first fastener system embodiment is shown. Blind fastener system 10 is shown comprising collet body 20, cylinder body 80, and stud 120. In addition to the portions and features described in detail below, collet body 20 also includes removable locking ring 72, and stud 120 also includes bushing 142. Unless otherwise indicated, all components of system 10 are constructed from a durable material such as any combination of metals or reinforced polymers, although high strength metallic alloys are preferred.

As best presented in FIGS. 4-6b, collet body 20 includes first end 22, which forms a first boundary for first wall portion 24. First wall portion 24 includes interior surface 26 and exterior surface 28, the latter of which includes annular protrusion 30 comprising leading face 32 and trailing face 34. A plurality of fingers 40 are formed in first wall portion 24 by secondary slots 36, each of which longitudinally extends from first end 22 to a terminus 38. As a consequence, features present at or near first end 22 are segmented in nature, although they may be referenced herein without consideration of such state, e.g., annular protrusion 30 is technically segmented, but not specifically referenced as such. Each finger 40 includes two exposed sectional portions referred to herein as finger face portions 42.

Adjacent first wall portion 24 is transition zone 44, which comprises interior surface 46 and exterior surface 50. As shown in the several Figures, interior surface 46 includes threads 48 formed therein. As will be described in greater detail below, threads 48, in combination with other threads, engage complementary threads of a stud to transform rotational motion of the stud into axial motion of the collet body.

Adjacent transition zone 44 is second wall portion 54, which is bounded by second end 52, which includes a surface there at. Second wall portion 54 includes interior surface 56, which like interior surface 46 includes threads (58) formed therein. Interior surface 56 further defines circumferential retaining ring groove 60 for receiving retaining ring 72. Exterior surface 62 preferably has a generally constant diameter from transition zone 44 to second end 52.

A plurality of segments 70 are formed in second wall portion 54 by ARM slots 64 that extend from interior surface 56 to exterior surface 62, each of which longitudinally extends from second end 52 to a terminus 66. Each segment 68 includes two exposed sectional portions referred to herein as segment face portions 68. A segment face portion 68 may be, and is preferably, substantially planar in geometry, and oriented to be substantially parallel to a radial line of the collet body.

The second part of a basic fastener according to this invention embodiment is cylinder body 80. Cylinder body 80 is bounded in the longitudinal direction by first and second ends 82 and 100, respectively, wherein each end defines one limit of respective first and second wall portions 84 and 102, and wherein each wall portion has interior and exterior surfaces (first wall portion 84 comprises interior surface 86 and exterior surface 90; second wall portion 102 comprises interior wall portion 104 and exterior wall portion 106). Interior surface 86 at first end 82 includes (segmented) lip or step 88, which, as will be described in the following paragraph, operatively contacts retaining ring 72. Interior surface 104 includes seat portion 108, which functions to transfer compression force from a stud to a work piece that is in contact with flange portion 110.

Figure 4:
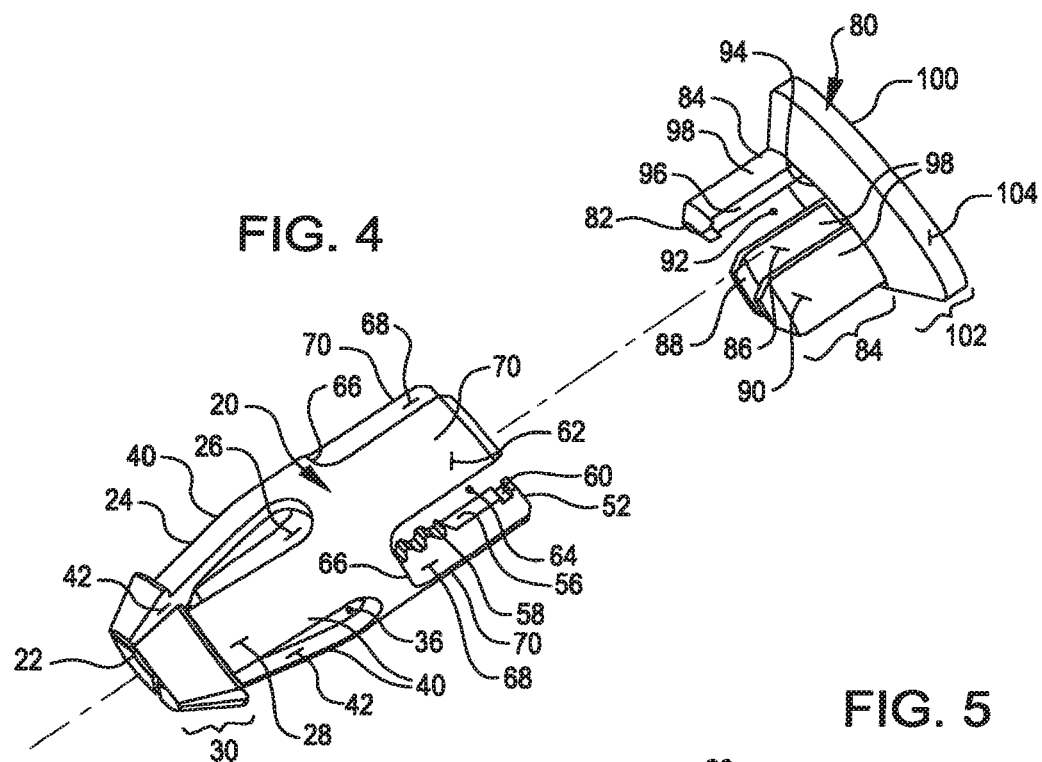
Figure 5:
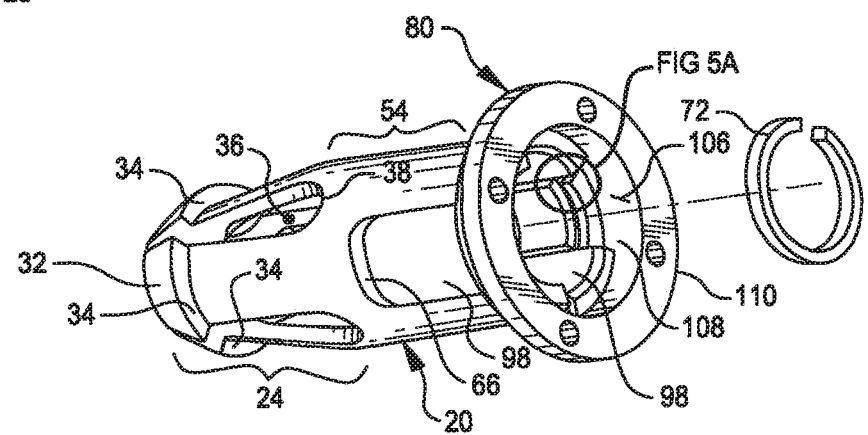
FIG. 5 is a perspective view of the mated components of FIG. 4 prior to introduction of a retaining ring into a retaining groove formed in a second end of the collet body.
Figure 5A:
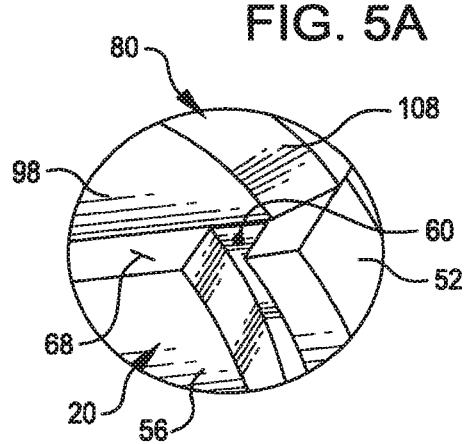
FIG. 5a is a detailed perspective view of the retaining groove formed in the collet body second end.
Figure 6:
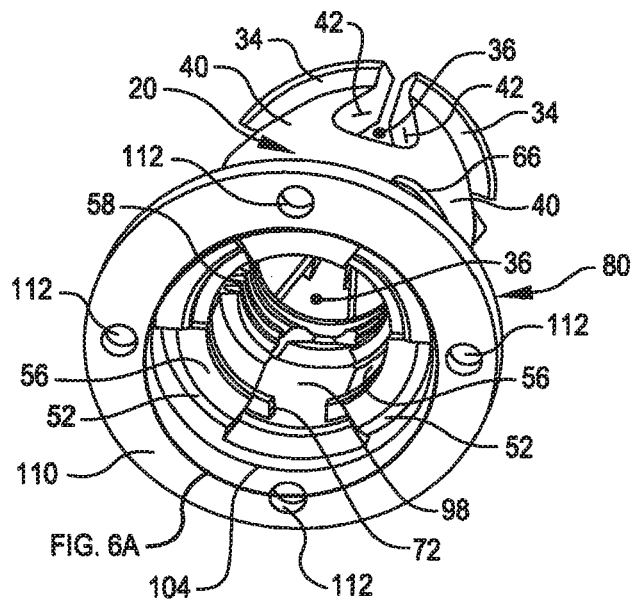
FIG. 6 is a perspective view of the mated components of FIG. 4 after introduction of the retaining ring into the retaining groove formed in the second end of the collet body.
Figure 6A:
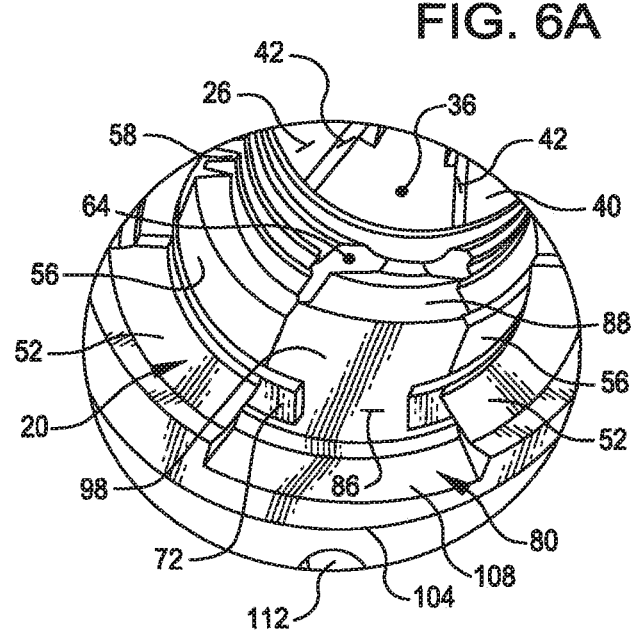
FIG. 6a is a detailed perspective view of the retaining ring in the retaining groove formed in the collet body second end.
Figure 6B:
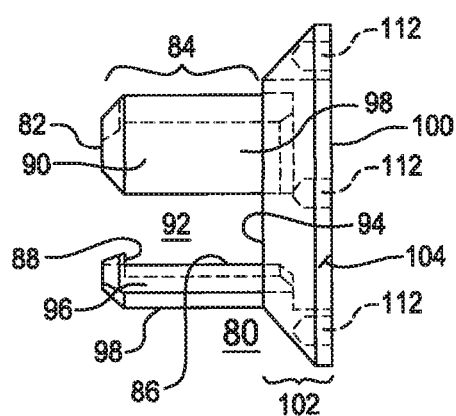
FIG. 6b is a side elevation view of the cylinder body particularly showing a translation arresting step or lip formed in the first end thereof.
Figure 7A:
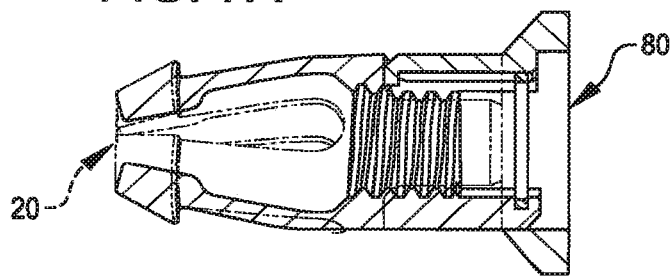
FIGS. 7A-C show the fastener arrangement of FIG. 6, in phantom, in an initial state, an intermediate state, and a final state, respectively.
Figure 7B:
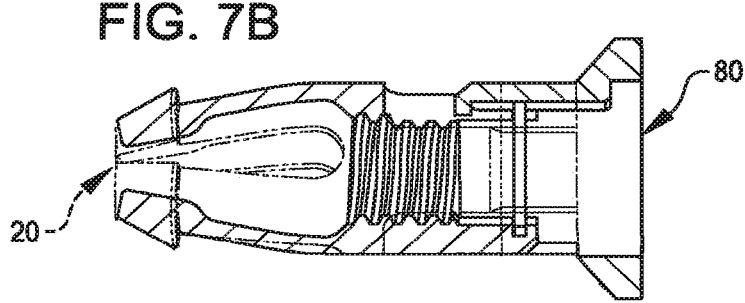
Figure 7C:
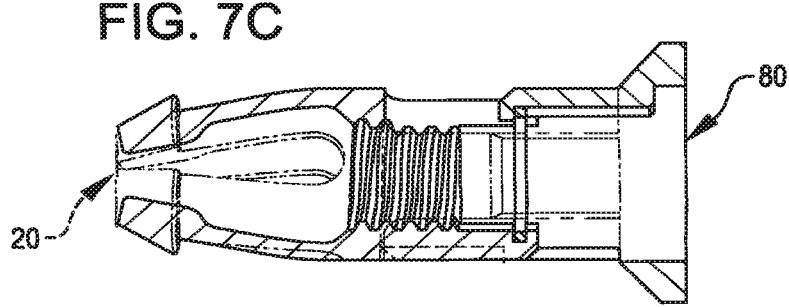

To achieve the fastening systems shown in FIGS. 2A-C and 3A-C from the components shown in FIG. 1, collet body 20 and cylinder body 80 are mated as shown in FIG. 4. Here, collet body 20 is axially mated with cylinder body 80 through the meshing of respective segments 70 and 98 within respective ARM slots 64 and 92. Once meshed to a maximum extent such that second end 52 of collet body 20 presents to second end 100 of cylinder body 80 (see FIGS. 5 and 5a), retaining ring 72 is introduced into groove 60 (see FIGS. 6 and 6a). Once inserted, collet body 20 and cylinder 80 are securely associated with each other by the interference between lip or step 88 of cylinder 80 and retaining ring 72 of collet body 20, as is best shown in the series of FIGS. 7A-C, which show the range of translation between these two parts.

Once collet body 20 has been securely associated with cylinder 80, stud 120 can be introduced there into. Turning to FIG. 8, stud 120 includes first or distal end 122 and reduced diameter portion 124 proximate thereto. At the opposite end of the stud is second or proximal end 130, which includes head 134. Head 134 in turn includes seat portion 136, peripheral or shoulder portion 138 and tool interface 140. Between these to ends are non-threaded portion 132 and body portion 126, which includes threads 128.

Upon insertion of stud 120 into cylinder 80 and collet body 120 as shown in FIG. 9, bushing 142 is fitted over reduced diameter portion 124. The maximum outer diameter of exterior surface 148 is preferably the same as that of threads 128. The longitudinal distance between distal end 144 and proximal end 146 is preferably commensurate with the intended working range of fastener system 10, e.g., the longitudinal distance between second end 52 and a terminus 66 of collet body 20. This relationship beneficially preserves the integrity of threads 128 so that the fastener system can be reused many times if desired. Bushing 142 also functions to retain stud 120 with the subassembly (basic fastener) of collet body 20 and cylinder body 80. This retention feature further facilitates reuse of the system by permitting easy removal of the system form its work pieces.

Figure 10A:
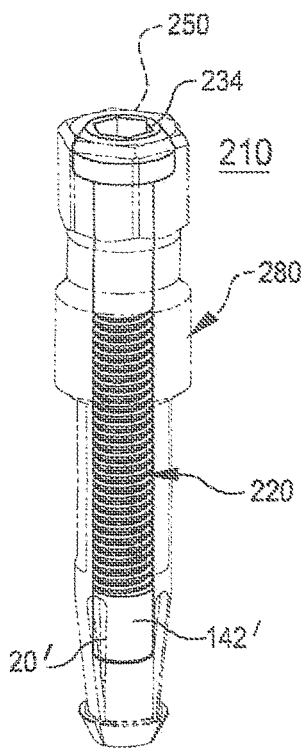
FIG. 10A is a perspective view in phantom of a second fastener system embodiment according to the invention wherein a collet body and matable cylinder body, and a threaded stud and matable bushing are shown in an initial state.
Figure 10B:
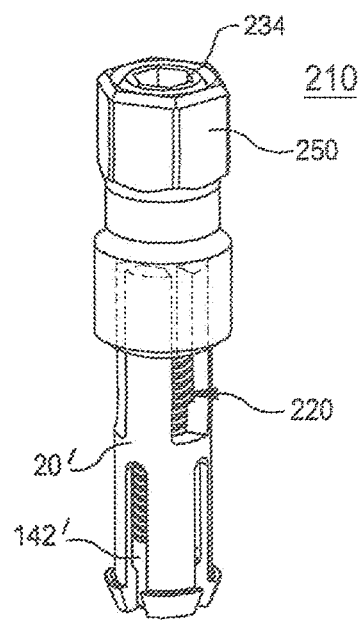
FIG. 10B is a perspective view of the fastener system of FIG. 10A shown in an intermediate state.
Figure 10C:
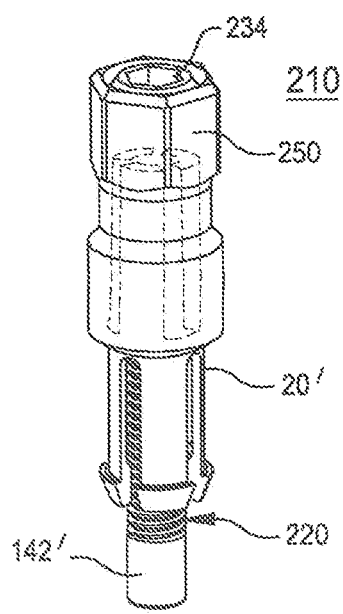
FIG. 10C is a perspective view of the fastener system of FIG. 10A shown in a final state.
Figure 11A:
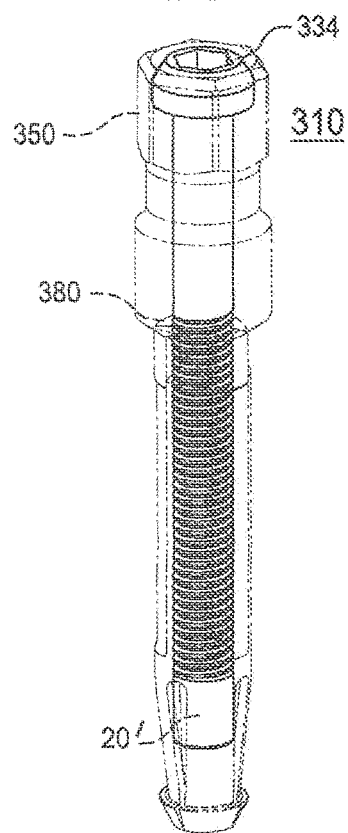
FIG. 11A is a perspective view in phantom of a third fastener system embodiment according to the invention wherein a collet body and matable cylinder body, and a threaded stud and matable bushing are shown in an initial state.
Figure 11B:
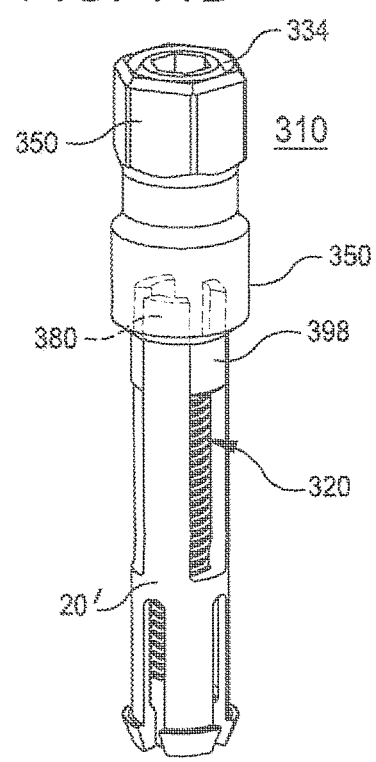
FIG. 11B is a perspective view of the fastener system of FIG. 11A shown in an intermediate state.
Figure 11C:
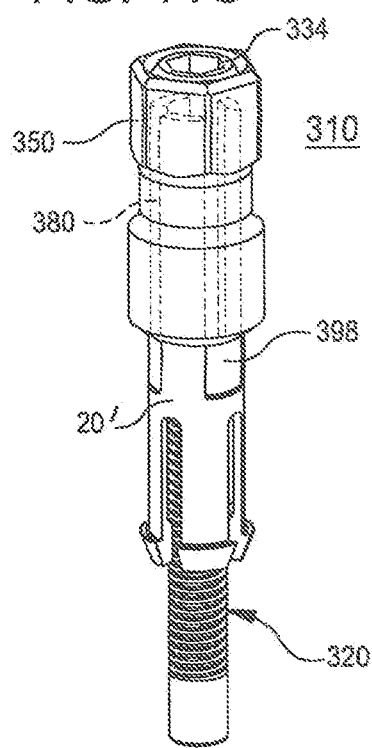
FIG. 11C is a perspective view of the fastener system of FIG. 11A shown in a final state.

When the components of FIG. 1 are assembled as described above, the resulting system in various stages of axial association are best shown in FIGS. 2A-C and 3A-C. It should be noted that the arrangement described so far can be extended to alternative embodiments. Once such alternative embodiment is shown in FIGS. 10A-C wherein collet body 20' is used in connection with fastener system 210. Collet body 20' is identical to collet body 20 except that the second wall portion is longitudinally lengthened and there is no retaining ring due to stud 220 having bushing 142' retaining collet body 20' and stud head 234 being held captive by outer sleeve portion 250. Cylinder body 280, however, has formed therein a plurality of lands and grooves (splines) having segment face portions generally of the same radial depth as the segment face portions of collet body 20'. However, the channels or grooves that bound the slots are shielded by an outer sleeve portion 250. A similar arrangement exists with respect to fastener system 310, although it extends the internal lands to form exposed segments 398, similar in structure and function to segments 98 in fastener system 10 described previously. Fastener system 310 is considered a hybrid between fastener systems 10 and 210.

The invention claimed is:

1. A blind fastener system, comprising:
   a cylinder body, including:
      a plurality of cylinder body segments extending from a flange portion; and
      a plurality of cylinder body slots positioned between the plurality of cylinder body segments, where the plurality of cylinder body slots extends from an interior surface of the cylinder body to an exterior surface of the cylinder body; and
   a collet body, including:
      a plurality of flexible fingers extending axially toward a first end;
      a plurality of collet body segments extending axially away from the plurality of flexible fingers and toward a second end opposing the first end; and
      a plurality of collet body slots positioned between the plurality of collet body segments, where the plurality of collet body slots extends from an interior surface of the collet body to an exterior surface of the collet body;
   where the plurality of cylinder body slots mate with the plurality of collet body segments and the plurality of collet body slots mate with the plurality of cylinder body segments to allow axial translation between the cylinder body and the collet body while preventing rotation between the collet body and the cylinder body.

2. The blind fastener system of claim 1, further comprising a stud including a threaded portion engaging with a threaded portion in the interior surface of the collet body.

3. The blind fastener system of claim 2, where the stud includes a reduced diameter portion positioned at a distal end of the stud.

4. The blind fastener system of claim 3, where the reduced diameter portion of the stud has a diameter that is less than a major diameter of the stud.

5. The blind fastener system of claim 4, further comprising a bushing coupled to the reduced diameter portion of the stud.

6. The blind fastener system of claim 2, where the stud includes a tool interface.

7. The blind fastener system of claim 1, further comprising a retaining ring at least partially enclosed within the cylinder body.

8. The blind fastener system of claim 7, where the retaining ring securely associates the cylinder body and the collet body.

9. The blind fastener system of claim 8, where the retaining ring is distally and proximally captured by a groove in the collet body and cooperates with a plurality of faces of the plurality of cylinder body segments.

10. The blind fastener system of claim 1, where each of the plurality of flexible fingers includes an annular protrusion configured to contact a work piece.

11. The blind fastener system of claim 10, where the flange portion of the cylinder body includes a work piece contacting surface.

12. The blind fastener system of claim 1, where the collet body includes an outer sleeve portion at least partially enclosing the plurality of collet body segments.

13. A blind fastener system, comprising:
    a cylinder body, including;
       a plurality of cylinder body segments extending from a flange portion; and
       a plurality cylinder body slots positioned between the plurality of cylinder body segments, where the plurality of cylinder body slots extends from an interior surface of the cylinder body to an exterior surface of the cylinder body;
    a collet body, including:
       a plurality of flexible fingers extending axially toward a first end;
       a plurality of collet body segments and a plurality of collet body slots positioned between the plurality of collet body segments, where the plurality of collet body segments extends axially away from the plurality of flexible fingers and toward a second end opposing the first end, where the plurality of collet body slots extends from an interior surface of the collet body to an exterior surface of the collet body; and
       a threaded portion in the interior surface of the collet body; and
    a stud including a threaded portion engaging with the threaded portion in the interior surface of the collet body;
    where the plurality of cylinder body slots mates with the plurality of collet body segments and the plurality of collet body slots mates with the plurality of cylinder body segments to allow axial translation between the cylinder body and the collet body while preventing rotation between the collet body and the cylinder body.

14. The blind fastener system of claim 13, further comprising a bushing coupled to a reduced diameter portion of the stud.

15. The blind fastener system of claim 14, further comprising a retaining ring at least partially enclosed within the cylinder body.

16. The blind fastener system of claim 13, where the stud includes a reduced diameter portion positioned at a distal end of the stud and where the reduced diameter portion has a diameter that is less than a diameter of the threaded portion.

17. The blind fastener system of claim 13, where the collet body includes an outer sleeve portion at least partially enclosing the plurality of collet body segments.

18. A blind fastener system, comprising:
    a cylinder body, including,
       a plurality of cylinder body segments extending from a flange portion including a surface configured to contact a work piece; and
       a plurality cylinder body slots positioned between the plurality of cylinder body segments, where the plurality of cylinder body slots extends from an interior surface of the cylinder body to an exterior surface of the cylinder body;
    a collet body, including:

a plurality of flexible fingers extending axially toward a first end, each of the plurality of flexible fingers including an annular protrusion configured to contact the work piece;

a plurality of collet body segments and a plurality of collet body slots positioned between the plurality of collet body segments, where the plurality of collet body segments extends axially away from the plurality of flexible fingers and toward a second end opposing the first end, where the plurality of collet body slots extends from an interior surface of the collet body to an exterior surface of the collet body; and a threaded portion in the interior surface of the collet body; and a stud including a threaded portion engaging with the threaded portion in the interior surface of the collet body;

where the plurality of cylinder body slots mates with the plurality of collet body segments and the plurality of collet body slots mates with the plurality of cylinder body segments to allow axial translation between the cylinder body and the collet body while preventing rotation between the collet body and the cylinder body.

19. The blind fastener system of claim 18, where the stud includes a reduced diameter portion positioned at a distal end of the stud and where the blind fastener system further comprises a bushing coupled to the reduced diameter portion of the stud.

20. The blind fastener system of claim 18, further comprising a retaining ring at least partially enclosed within the cylinder body and securely associating the cylinder body and the collet body.

21. The blind fastener system of claim 18, where the collet body includes an outer sleeve portion at least partially enclosing the plurality of collet body segments.

* * * * *